United States Patent [19]

Kinzenbaw

[11] 4,036,306

[45] July 19, 1977

[54] MULTI-UNIT ADJUSTABLE PLOW PULLED BY VEHICLE AND HAVING STEERING WHEEL TURNABLE ONLY ON ADJUSTMENT OF PLOW

[75] Inventor: Jon E. Kinzenbaw, Williamsburg, Iowa

[73] Assignee: DMI Inc., Goodfield, Ill.

[21] Appl. No.: 617,891

[22] Filed: Sept. 29, 1975

[51] Int. Cl.² .............................................. A01B 69/00
[52] U.S. Cl. .................................... 172/287; 172/310; 172/633; 172/693
[58] Field of Search ............... 172/206, 212, 218, 253, 172/278, 279, 280, 281, 282, 283, 284, 285, 286, 287, 413, 619, 632, 633, 693, 310

[56] References Cited

U.S. PATENT DOCUMENTS

| | | | |
|---|---|---|---|
| 2,979,140 | 4/1961 | McKenzie | 172/413 X |
| 3,066,746 | 12/1962 | Sweet | 172/284 |
| 3,817,333 | 6/1974 | Kinzenbaw | 172/283 |
| 3,818,995 | 6/1974 | Mellen | 172/212 |
| 3,965,989 | 6/1976 | Ward | 172/310 |

FOREIGN PATENT DOCUMENTS 453,144 11/1927 Germany ........................... 172/633

*Primary Examiner*—Richard T. Stouffer
*Attorney, Agent, or Firm*—Tilton, Fallon, Lungmus, Chestnut & Hill

[57] ABSTRACT

The plow system may carry as many as 10 or 14 individual plow units. All of the units are connected together by a tie rod and may be pivoted in unison relative to a main frame. By pivoting the units, they may be opened or closed to adjust the width of cut between adjacent units over a continuous, wide range. The main articulated frame includes a forward frame section with a main beam inclined relative to the direction of travel of the vehicle, and the rear frame section with a main beam in axial alignment with the main beam of the forward frame section. The forward frame section and rear frame sections are pivotally connected together for rotation about a horizontal axis to permit the system to follow the contour of the ground extending in the direction of travel. The system includes a forward furrow wheel, a rear furrow wheel, and a steerable intermediate support wheel which rides on unplowed ground ahead of the system and is steered as a function of the adjusted position of the plow units.

7 Claims, 8 Drawing Figures

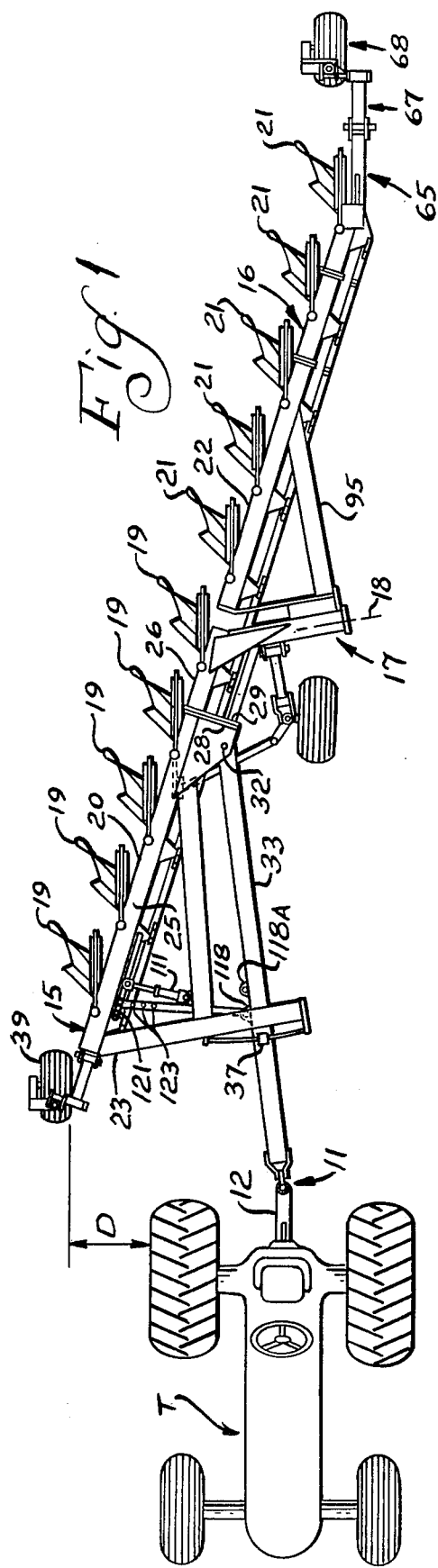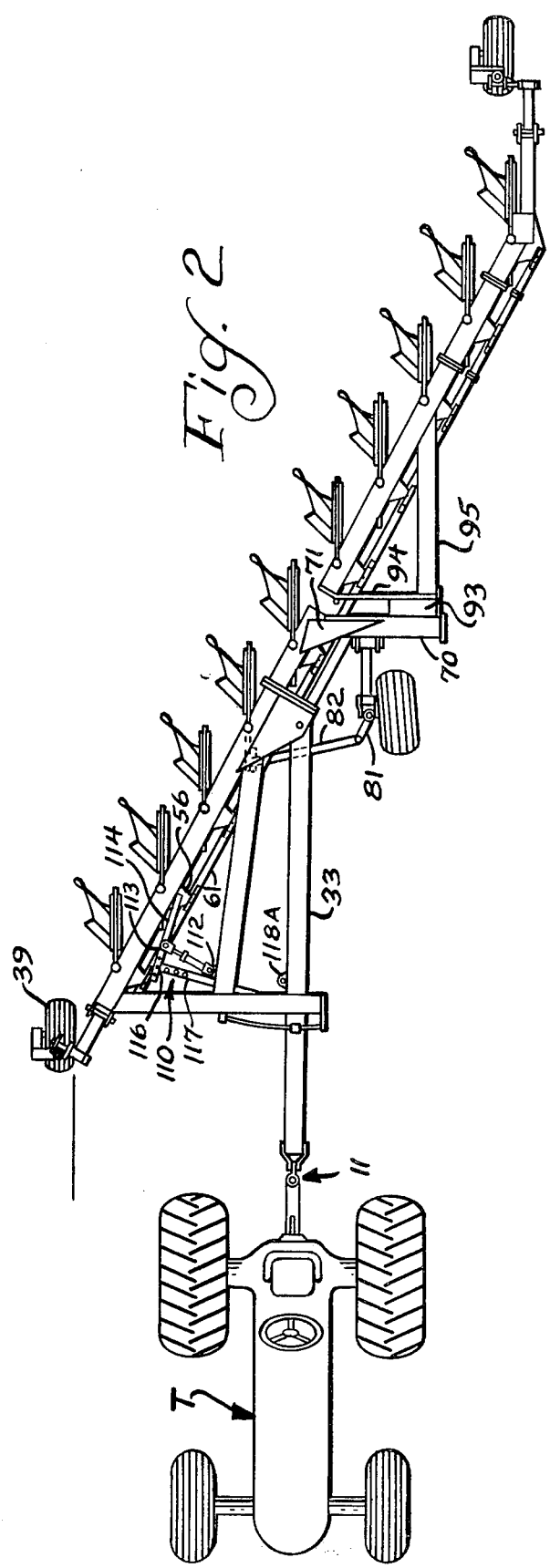

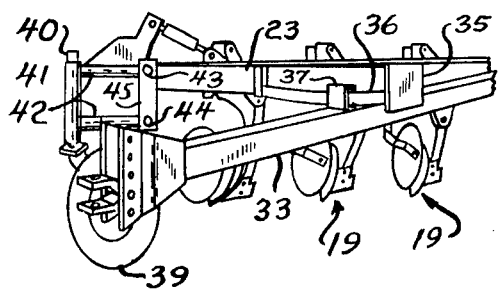
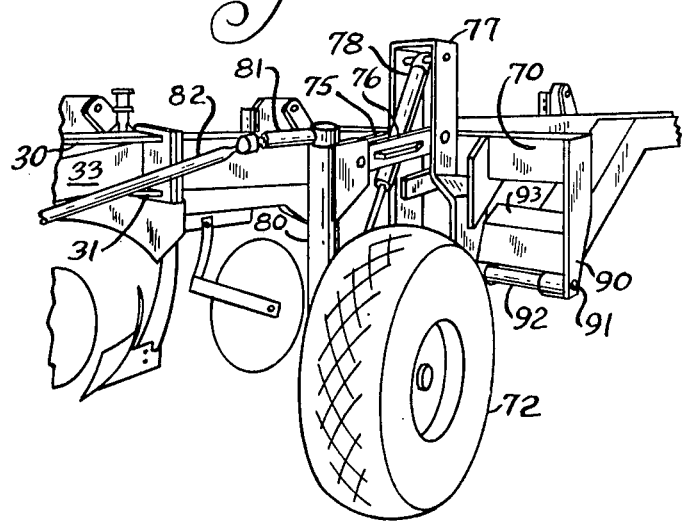
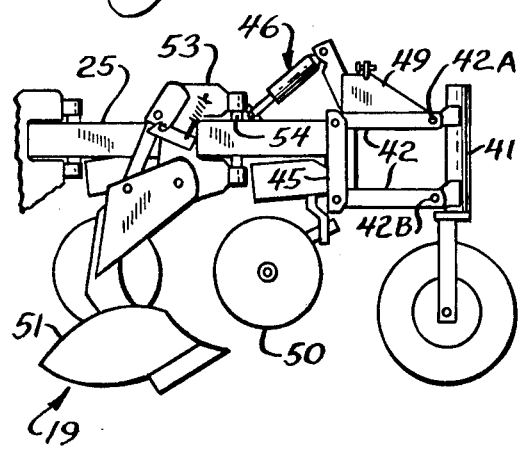
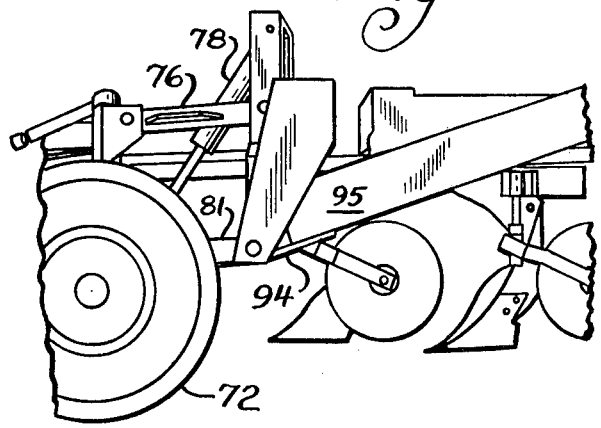
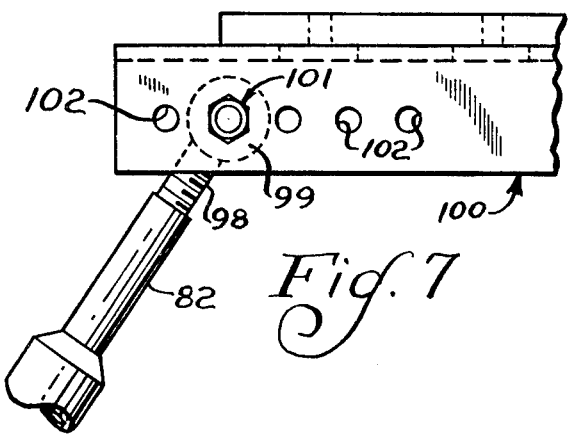
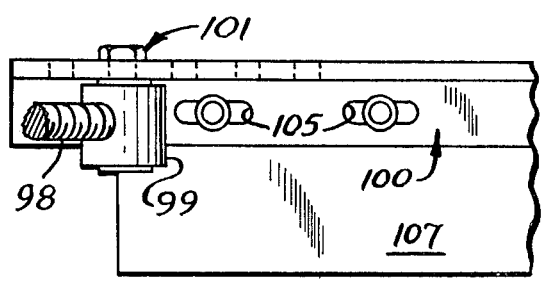

MULTI-UNIT ADJUSTABLE PLOW PULLED BY VEHICLE AND HAVING STEERING WHEEL TURNABLE ONLY ON ADJUSTMENT OF PLOW

BACKGROUND AND SUMMARY

The present invention relates to a plow system; and more particularly, it relates to a plow system with a number of individual plow units mounted to a main frame for adjustment about their respective vertical axes. This adjustment permits the units to be "opened" or "closed" by an operator from the traction vehicle pulling the plow system, without leaving his position and while continuing to operate the vehicle. Such a system is disclosed in my U.S. Pat. No. 3,817,333, granted June 18, 1974. Another multi-bottom plow system is disclosed in the Thompson U.S. Pat. No. 3,559,745, but this latter is directed to a system in which the plow units may be shifted either full-right or full-left, depending upon whether the operator wants to plow with the newly-plowed ground on his right or on his left.

In early commercial multi-unit plow systems, the number of plow units or bottoms has been limited generally in the range of five or six units mounted on a single, rigid frame. There has been no need of adding additional units because the limiting factor has been the draw power of the traction vehicle, particularly when the plow units are set for plowing at deeper levels.

More powerful tractors are now readily commercially available; but if one simply extends the concept in my above-identified patent by adding plow units to a single rigid beam, the length of that beam may be as long as 32 or 33 feet for a system with 10 plow units, and correspondingly longer for a system with 14 plow units, of course. Such a large system is difficult to support. Further, there are problems in providing the flexibility that such a system should have, both during plowing over the various range of lateral settings for the plow bottoms, and for the various maneuvers required during plowing. Still further, there is the problem of following the contour of the land with a very long, rigid main beam extending over 30 feet.

Briefly, the present invention provides a main articulated frame including a forward frame section with an inclined main beam, and a rear frame section with an inclined main beam. A first plurality of plow units or bottoms are pivotally mounted for rotation about vertical axes on the forward frame section, and a second plurality of plow units are similarly mounted on the rear frame section. The forward frame section and the rear frame section are mounted together for rotation about a horizontal axis extending generally transverse to the direction of vehicle travel, thereby articulating the forward and rear frame sections relative to each other, and permitting them to independently follow the contour of the ground. This is important because when a farmer sets the system for plowing at a given depth, he wants all of the units plowing at that depth, and variations of even an inch or so are undesirable. Depending upon the curvature of the ground, much greater variations would occur if a main beam having a length of over 30 feet were rigid and not permitted to follow the contour of the ground.

A guide beam or tie rod interconnects all of the individual plow units, both on the forward frame section and the rear frame section so that they are all rotated in unison. Rotation of the plow units is effected by means of a hydraulic cylinder unit and linkage assembly on the forward frame section, the linkage being interconnected between an individual plow unit and a tongue or draft member which is pivotally connected to the tractor and pivotally connected to the forward frame section at a location toward the rear of that section.

For supporting the system, in addition to the weight borne by the tractor hitch, there are three support wheels: a first caster wheel located at the front of the unit and to the right of the rear tractor wheel for riding in a previously-cut furrow; a rear caster wheel for following in the furrow cut by the last plow unit; and an intermediate wheel which rides on unplowed ground and is steered as a function of the adjusted width of the individual plow units. Three additional hydraulic cylinders are provided, one for each of the support wheels for selectively raising and lowering the system, not only to adjust plowing depth, but to raise all of the units out of the ground to provide sufficient clearance for road travel.

Thus, the present invention provides a plow system which is capable of accommodating as many as 14 individual plow units while adjusting all of the units in unison, and which is capable of following the contour of the ground being plowed for all of the various width adjustment settings.

Other features and advantages of the present invention will be apparent to persons skilled in the art from the following detailed description of a preferred embodiment accompanied by the attached drawing wherein identical reference numerals will refer to like parts in the various views.

THE DRAWING

FIGS. 1 and 2 are plan views of a system incorporating the present invention with the plow units set respectively at a relatively narrow setting and a relatively wide setting;

FIG. 3 is a fragmentary perspective view of the front of the plow system, taken from the left side of the tractor;

FIG. 4 is a fragmentary perspective view of that portion of the system of FIG. 1 which includes the steerable intermediate wheel;

FIG. 5 is a fragmentary right side view of the front portion of the system of FIG. 1;

FIG. 6 is a side elevational fragmentary view of the juncture between the forward frame section and the rear frame section of the system of FIG. 1; and FIGS. 7 and 8 are respectively top and side fragmentary views illustrating the connection of the steering link to the forward frame section.

DETAILED DESCRIPTION

Referring to FIGS. 1 and 2, a conventional traction vehicle is indicated as T, and the plow system of the plow system of the present invention is generally designated by reference numeral 10. The plow system is pivotally connected at 11 to a draw bar 12 on the tractor T for rotation about a vertical axis.

The plow system has a main frame generally designated by reference numeral 14 which includes a forward frame section 15 and a rear frame section 16 which are connected together at a location designated 17 for relative pivotal movement about a horizontal axis 18.

A first plurality of plow units, sometimes called "plow bottoms", and designated 19 are pivotally mounted for rotation about their respective vertical axes to an inclined main beam 19 of the forward frame section 15. Similarly, a second plurality of plow units 21 are pivotally mounted to an inclined main beam 22 of the rear frame section 16.

Although the rear frame section is mounted to the forward frame section in such a manner as to articulate the entire frame about the axis 18, nevertheless, as will be more fully explained below, there is no relative pivotal motion about a vertical axis. Hence, the axis of the forward inclined beam 20 is maintained in the same vertical plane as the axis of the rear inclined beam 22. Since this plane is inclined at an acute angle relative to the direction of travel of the tractor, the beams are spoken of as being "inclined".

Turning now to the forward frame section 15, in addition to the inclined beam 20, it comprises a forward transverse beam 23 which is welded to the forward end of the inclined beam 20, and a third beam 24 which is welded at approximately the mid-section of the transverse beam 23 and extends generally rearwardly, and is secured to an intermediate point of the inclined beam 20.

The inclined forward beam 20 itself is divided into a forward section 25 and a rear section 26 which are butted together by means of endplates 28, 29 welded respectively to the rear end of the section 25 and to the forward end of the section 26.

Turning now to FIG. 4, upper and lower braceplates 30, 31 are welded to the upper and lower surfaces respectively of the forward portion 25 of the forward inclined beam 20, and they are also welded to the forward surface of the endplate 28, and to the rear portion of the intermediate beam 24. This provides a housing for pivotally connecting at 32 the rear end of a tongue or draft member 33. The forward end of the draft member 33 is connected to the draw bar 12, and it passes beneath the transverse beam 23 of the forward frame section. The transverse beam 23 is provided with an endplate 35, and a curved track 36 extending between the endplate 35 at an intermediate location. The curvature of the track 36 is such as to permit rotation of the forward frame section about the pivot location 32, and the track 36 passes through a guide 37 which may be provided with a roller or other friction-reducing means to facilitate relative motion between the track 36 and the tongue 33.

The forward end of the forward frame section is supported by a caster wheel 39 which, as can best be seen in FIG. 3, includes a vertical shaft 40 journaled in a sleeve 41. Extending rearwardly from the sleeve 41 are upper and lower links 42 which are pivotally connected at their forward ends 42A and 42B to the sleeve 41 and pivotally connected at their rear ends at 43 and 44 to affix link 45 (see FIG. 5). The link 45 is connected to the forward portion of the forward frame section. The hydraulic cylinder and piston rod unit 46 (not seen in FIGS. 1 and 2) has its rod end 47 pivotally connected to the forward portion 25 of the inclined main beam 20, and has its cylinder end pivotally mounted at 48 to a plate 49 attached to the upper one of the link 42. Thus, when the cylinder unit 46 is expanded, the links 42 and fixed link 45 act as a parallelogram linkage arrangement to raise the forward end of the plow system.

The plow units 19 and 21 may be the same as those disclosed in my above-identified patent, including a coulter 50 and a plow shear 51, together with a C-shaped yoke 53 (see FIG. 5) which straddles the inclined beam and is rotatably mounted to a vertical shaft 54 fixed to the beam.

Turning now to FIG. 5, each of the forward plow units 19 and rear plow units 21 includes a fixed horizontal plate, designated 56 for the forward units and 57 for the rear units, to which there is pivotally connected an elongated tie rod or guide bar 60. As indicated in the above-identified patent, the tie rod 60 is parallel to the axis to the main inclined beam (in this case both forward and rear sections) so that all plow units may be rotated in unison. In this case, the tie rod 60 includes a forward section 61 and a rear section 62 which are connected together to permit the rod to bend in a vertical plane which includes the axis 18, while continuing to rotate all of the individual plow units in unison about their respective vertical axes.

The rearmost plow unit, still referring to FIGS. 1 and 2 is integrally connected to a tail section generally designated by reference numeral 65 which includes a beam 66, a parallelogram linkage 67, and a rear caster wheel 68. The parallelogram linkage 67 is similar to that discussed in connection with the forward caster wheel, and the overall tail section is similar to that disclosed in the above-identified patent. The hydraulic piston and cylinder rod unit, not shown in FIGS. 1 and 2, may be used to raise the rear section of the plow system.

Referring now to FIGS. 2, 4 and 6, a beam 70 is welded to the rear end of the forward inclined beam 15, to extend laterally thereof, and the connection is strengthened by a braceplate 71. A steering support wheel 72 is mounted in front of the beam 70 as shown at 75, 76 in FIG. 4. A housing 77 extending above the beam 70 and attached to it holds a hydraulic cylinder and piston rod unit 78 for raising and lowering the beam 70 to the ground.

The tire 72 is provided with a vertical axle which is pivotally journaled in a sleeve 80, the upper end of the axle being provided with a steering arm 81. A link 82 is pivotally connected between the steering arm 81 and the forward end of one of the plow units—in the illustrated embodiment, the connection being at the forward end of the fifth plow unit on the frame section. It will thus be observed that as the tie rod 60 is translated toward the rear, all of the plow units will be rotated counterclockwise (as seen in FIG. 2), and that the link 82 will cause the steering arm 81 to rotate the wheel 72 in such a manner that after the plow has swung around to assume the opened position, the tire 72 will still be in a steering position.

Thus, the steering wheel 72 rides on unplowed land, supports the center portion of the plow unit, and is provided with a steering mechanism responsive to the positioning of the plow units for properly steering that center portion.

The lower end of the piston and cylinder rod unit 78 is connected to the forward end of a lower link 81, the rear end of which is pivotally connected to the lower portion of the housing 77. Thus, the center of the system is also capable of being selectively raised or lowered by means of a parallelogram linkage and a cylinder and piston rod unit.

At the outboard end of the beam 70 is a downwardly extending plate 90, and an axle 91 is mounted between the lower portion of the plate 90 and the lower extension of the housing 77. Journaled about the center portion of the axle 91 is a sleeve 92 and an upper extension 93 and lower plate 94 (see FIG. 6) to which is mounted an upwardly inclined, rearwardly extending beam 95.

As best seen in FIG. 2, a forward brace bar 94 extends between the extension 93 and the forward portion of the rear inclined beam 22 to strengthen the structure. The rear end of the draw beam 95 is welded to an intermediate location of the rear inclined beam 22. Thus, the rear frame section is drawn by the lateral beam 70, axle 91, sleeve 92, and its connection to the draw beam 95.

Referring now to FIGS. 7 and 8, the connecting link 82 is internally threaded and receives a mating stud 98, the distal end of which is ringed as at 99 for connection to an angle iron generally designated 100 by means of a nut and bolt fastener 101. The angle iron 100 is provided with a series of aperture 102 which are located in a horizontal portion of it for adjustably connecting the rod 82 to provide different types of compensation of the type just mentioned—namely, for crowding or towing of the steering wheel 72, depending upon soil conditions. Still further adjustment is provided by the vertical arm of the angle iron 100 (see FIG. 8) which is provided with horizontally elongated slots 105 for bolting the angle iron to an extension 107 of the plow unit to which it is attached. Thus, the slots 105 provide a "fine" tuning of the steering adjustment, and the bolts 102 provide a larger adjustment.

Turning now to the left portion of FIGS. 1 and 2, there is shown the mechanism for adjusting the width of the plows generally designated by reference numeral 110 and including a hydraulic cylinder and piston rod unit 111 pivotally connected at 112 to the intermediate beam 24 of the forward frame section, and pivotally connected at 113 to a crank arm 114. The rear end of the arm 114 is rigidly attached to the plate 56 of the second plow unit from the forward end, and its own forward end is pivotally connected at 116 to a second link 117, the other end of which is pivotally connected at 118 to the tongue 33. The arm 114 is provided with a series of apertures 121 for adjusting the connection of the link 117 thereto, and similarly, the link 117 may be provided with a number of adjusting apertures, designated 123 in FIG. 1. Still further, the tongue is provided with a second boss 118A at which the link 117 may be connected. Another boss may also be provided. Such adjustment may be necessary or desirable for varying soil conditions and adjustments in plowing depth, both of which modify the force on the plow units.

In operation, the forward caster wehel rides in a furrow of previously plowed land, and the rear caster wheel 68 rides in a furrow of land which has just been plowed by the system. The steering wheel 72 rides on unplowed ground.

Referring to the showing of FIG. 1, the plow units are adjusted for a cut of 12 inches between units, and the foremost unit is placed so that it cuts a 12-inch slot relative to the previously plowed ground. When it is desired to open the units—that is, increase the spacing, the hydraulic cylinder unit 111 (which is a double-acting unit) is contracted. This rotates the plow units in a counterclockwise direction, and it also rotates the steering wheel, but in a counterclockwise direction. The inclined main beam will thence pivot about the caster wheel 39 and the hitch 11 to the adjusted position. A wider cut, namely a 22-inch cut between units, is shown in FIG. 2.

When the cylinder unit 111 is contracted, the arm 114 is drawn away from the inclined main beam, and because of the link 117, the inclined beam is caused to rotate about the pivot connection 32 relative to the tongue 33. In other words, during opening of the units, when the inclined main beam swings to the left as viewed from the rear, the forward cross beam 23 slides over the tongue 33, and the tongue 33 pivots about the hitch point in a clockwise direction from the position of FIG. 1 to that of FIG. 2. This arrangement permits the driver of the tractor to maintain a fixed distance, indicated by the arrow D in FIG. 1, between his rear wheel and a previously-cut furrow for all adjustments of the plow units. The tractor T in the drawing is shown with only two main rear wheels, but persons skilled in the art will readily appreciate that a pair of dual wheels may be added for increased traction. Nevertheless, the spacing from a previously-cut furrow to the tractor wheel remains constant for the various adjustments of the plow units, and whereas the net rearward thrust on the main inclined beam and the system itself may shift relative to the location of the hitch point, this thrust is compensated for a continuous basis by to toeing the steering of the wheel 72 to offset it.

Having thus described in detail preferred embodiments of the invention, persons skilled in the art will be able to modify certain of the structure which has been illustrated and to substitute equivalent elements for those disclosed while continuing to practice the principle of the invention; and it is therefore intended that all such modifications and substitutions be covered as they are embraced within the spirit and scope of the appended claims.

I claim:

1. In combination with a vehicle, a plow system adapted to be pulled by said vehicle, said flow system comprising: an articulated main frame including
   a forward frame section including a first inclined beam,
   a rear frame section including a second inclined beam, and
   means for pivotally mounting the forward end of said rear frame section to the rear end of said forward frame section for pivotal movement about a horizontal axis, the axes of said first and second inclined beams extending generally in the same vertical plane when said system is in operation;
   hitch means for pivotally connecting said main frame to said vehicle;
   a first plurality of plow units mounted for rotation about vertical axes to said first inclined beam;
   a second plurality of plow units mounted for rotation about vertical axes to said second inclined beam;
   power means for rotating said plow units in unison to adjust the cut between adjacent units;
   support wheel means for supporting said system including a steering wheel mounted for steering motion about a vertical axis on unplowed ground when said system is in operation;
   linkage means responsive to the adjustment of said plow units for turning said steering wheel with respect to said frame sections, said linkage means turning said steering wheel with respect to said frame sections only in response to the width adjustment of said plow units and independent of the turning of said vehicle and said linkage means further maintaining said steering wheel in fixed position with respect to said frame sections for a given adjusted setting of said units independent of the turning of said vehicle.

2. The apparatus of claim 1 wherein said power means includes connecting means for tying all of said first and second pluralities of plow units together so that they rotate in unison.

3. The system of claim 2 wherein said connecting means is articulated for rotation about a horizontal axis parallel to the axis of articulation of said main frame.

4. The apparatus of claim 1 wherein said support wheel means comprises a first caster wheel mounted at the forward end of said main frame; a second caster wheel mounted at the rear end of said main frame; and wherein said steering wheel is mounted at an intermediate location adjacent the rear end of said forward frame section.

5. The apparatus of claim 4 wherein said steering wheel includes a steering arm and wherein said linkage means comprises a link pivotally connected at one end to one of said plow units and pivotally connected at the other end to said steering arm for steering said steering wheel as said units are rotated.

6. The apparatus of claim 4 wherein said first caster wheel is mounted for riding in a previously cut furrow, and wherein said second caster wheel is mounted for riding in a furrow cut by the rearmost plow unit; and wherein said steering wheel is mounted for riding on unplowed ground.

7. The apparatus of claim 4 wherein each of said wheels is provided with a hydraulic cylinder and piston rod unit and linkage means for selectively raising said main frame relative to an associated wheel.

* * * * *